United States Patent [19]

White

[11] 4,354,885

[45] Oct. 19, 1982

[54] HARD-EDGE WALLBOARD

[75] Inventor: George H. White, North Tonawanda, N.Y.

[73] Assignee: National Gypsum Company, Dallas, Tex.

[21] Appl. No.: 273,587

[22] Filed: Jun. 15, 1981

[51] Int. Cl.$^3$ ........................ B32B 13/00; B05D 5/00; B32B 3/26; B29H 7/20

[52] U.S. Cl. ........................ 156/39; 427/284; 264/50; 428/312.4; 428/316.6

[58] Field of Search ........................ 156/39, 43, 44, 45; 427/284, 285; 428/304, 305; 106/111, 112, 116; 264/50, 46.6, 42

[56] References Cited

U.S. PATENT DOCUMENTS 2,985,219 5/1961 Summerfield ........................ 156/39

4,279,673 7/1981 White ........................ 156/39

*Primary Examiner*—Edward C. Kimlin

*Assistant Examiner*—Louis Falasco

*Attorney, Agent, or Firm*—Robert F. Hause

[57] ABSTRACT

A method of making gypsum wallboard in which a portion of the conventional foamed gypsum slurry for forming the wallboard core is fed through a relatively high speed agitator, wherein a special addition of material is thoroughly admixed therewith to increase the fluidity without adversely affecting the density or setting characteristics and this portion of the slurry is then disposed along the edge portion of the wallboard being formed, whereby a hard-edge wallboard is produced under conditions including improved uniformity of core edge setting time, density and dimensions and reduced plug-ups of feed lines through which the core-edge material is fed.

9 Claims, 4 Drawing Figures

Fig. 1
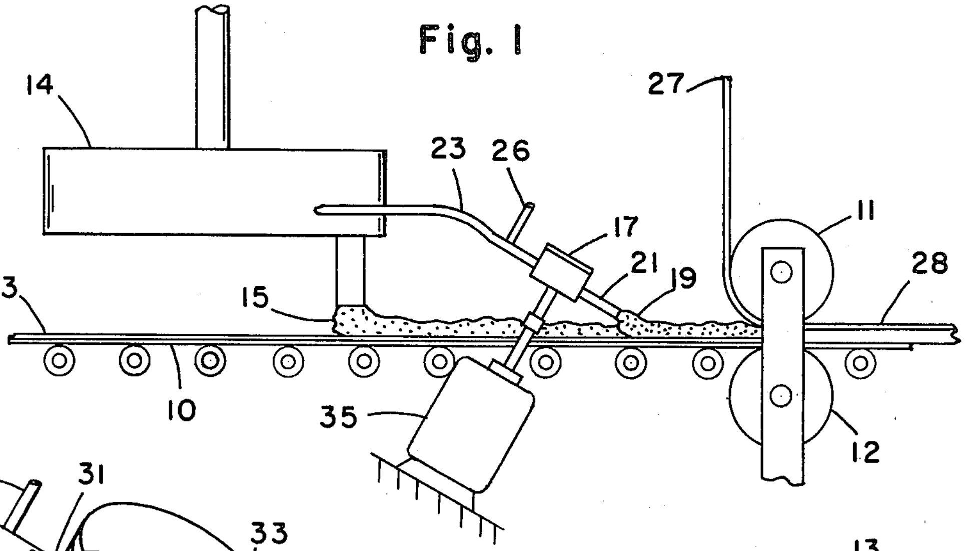
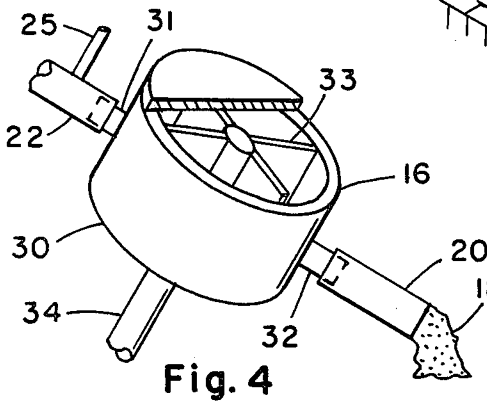
Fig. 4
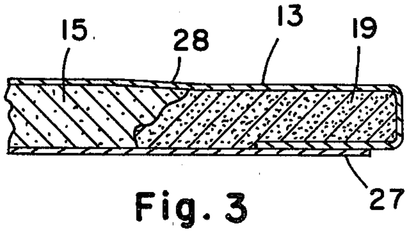
Fig. 3
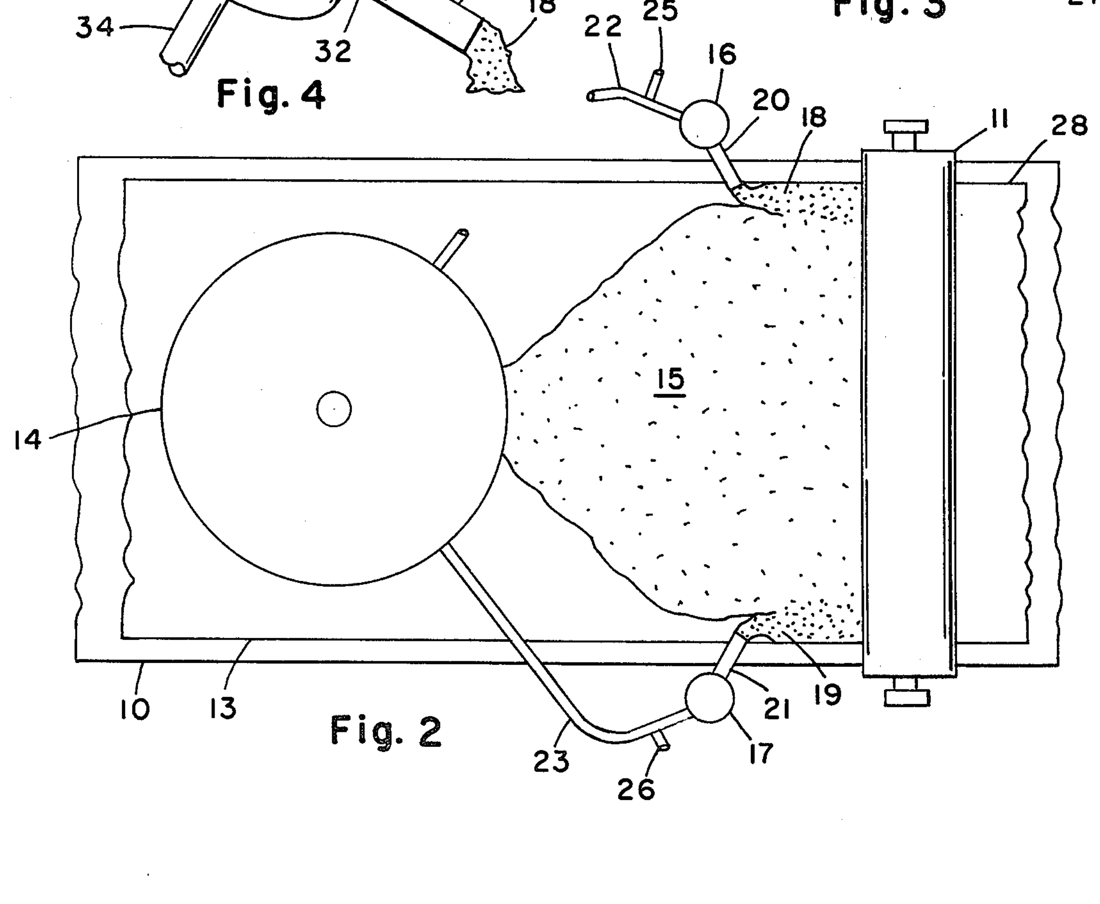
Fig. 2

HARD-EDGE WALLBOARD

This invention relates to a method of providing improved hard-edges on gypsum wallboard using a method which reduces production problems.

In the Teale U.S. Pat. No. 2,762,738, methods are described for providing a gypsum wallboard unitary monolithic core having edge portions of greater density than the main central portion of the monolithic core; which is also an object of the present invention. The Teale patent describes a preferred embodiment in which a pair of relatively small auxiliary mixers each deposit a stream of mixed gypsum slurry which is the same, as to ingredients and proportions, as the main stream of gypsum slurry from a main mixer, excepting only that the foam or foaming agent is omitted.

In addition to this description of a preferred embodiment, the Teale patent further vaguely refers to eliminating the cellular nature of the board at its edge portions, and in this respect the means of accomplishing this, as described, is to deposit all of the cementitious slurry on a paper facing sheet in a foamed state and then subsequently eliminate the foam from the edge portions of the deposit by agitation, the use of defoaming agents, or otherwise.

Subsequent to the Teale patent, it became common to divert a portion of the foamed gypsum slurry from a main mixer into one or two small mixers whereat the foamed mix was subjected to a high speed rotary agitator which caused the foamed slurry to become relatively denser. This denser material was then deposited along the edges of the wallboard core being formed.

Several problems were common in using this high speed rotary agitator. One primary problem was the excessive amount of continuous accumulation of settable gypsum in the hose which conveyed the relatively densified foamed mix from the high speed rotary agitator to the edges of the wallboard core being formed. A second problem, which stems in part from the first problem, is the need to use a relatively larger hose than would be best for controlling the placement of the densified mix, whereby the size of the hard-edge portion of the board core cannot always be reduced to optimum desired dimensions. A third problem, which also stems in part from the first problem, is the degree to which the densified mix is non-uniform and sometimes not densified, caused by variations in the time of passage of different portions of material through a partially clogged hose, with some portions being more advanced in the setting reaction, and with some set accelerating effects by the presence of set material in the hose.

One improvement over the above-described common method of forming hard-edged wallboard is set forth in my copending joint application, with Donald J. Petersen, Ser. No. 120,566, filed Feb. 11, 1980, now U.S. Pat. No. 4,279,673, in which the densified mix is formed in a relatively low speed rotary agitator, while admixing a defoaming agent therewith.

The present invention involves admixing a freshly added quantity of a material which will increase the fluidity of the agitated, defoamed material, such as a gypsum set control retarder or a water reducing agent.

It has now been recognized that the high speed agitators were creating an excessive accelerating effect on the settable gypsum present. The present invention involves a recognition of the fact that an effective quantity of, preferably, gypsum set control retarder or, alternatively, a water reducing agent can be added to the mix subjected to high speed agitation, and disposed along the edge of the wallboard, without creating wallboard edge portions which are still unset as the central portion of the core becomes set. The presence of this fresh additive in the densified mix eliminates or substantially reduces the accumulation of settable gypsum in the hose through which it is pumped, providing many advantages in the manufacture of hard-edge gypsum wallboard.

It is an object of the present invention to provide a novel means for preventing overdrying and/or underdrying of the edges of gypsum wallboard while in a wallboard dryer, thus avoiding soft calcined edges, wet edges and cupped tapers.

It is a further object to provide a method of increasing wallboard edge densities while reducing manufacturing problems, including machine wear.

It is a still further object to provide a method of increasing wallboard edge densities under conditions permitting greater control and resulting in an improved quality wallboard, all at reduced cost.

These and other objects and advantages of the invention will be more readily apparent when considered in relation to the preferred embodiments as set forth in the specification and shown in the drawings in which:

FIG. 1 is a fragmentary, somewhat schematic side elevational view of a continuous wallboard machine which is generally conventional in construction and arrangement but is adapted to perform one form of the present invention;

FIG. 2 is a top plan view of the apparatus of FIG. 1;

FIG. 3 is a cross-section through the edge portion of a section of gypsum wallboard made by the method of the present invention; and FIG. 4 is an enlarged perspective view with portions broken away of an agitator for mixing a gypsum set retarder into a portion of the foamed gypsum slurry.

Referring to FIGS. 1 and 2, there is shown a standard continuously moving conveyor 10 of a gypsum wallboard machine, upper master roll 11, lower master roll 12, and a lower wallboard cover paper facing sheet 13, being conveyed along on conveyor 10. A main mixer 14 deposits a stream of mixed calcined gypsum, water and foam on sheet 13 in the usual manner.

In conventional wallboard manufacture, at least in one common mode of procedure, the side edges of lower facing sheet 13 are turned up at acute or right angles, preferably but not necessarily before sheet 13 arrives at the main mixer 14. Subsequently, and commonly just before the sheet reaches the master rolls, these upstanding edge portions of sheet 13 are turned inwardly over the top of the deposited core and immediately thereafter a top cover sheet is applied just as the facing sheet 13 and the deposited core reach and begin to pass between the master rolls.

These instrumentalities for effecting the upfolding and the infolding of the facing sheet 13 are entirely conventional and, since they do not affect the principles of the present invention, they are not illustrated in the drawing.

Mixer 14 may be a ball mixer, a pin mixer, a combination of both, or of any other suitable type. In FIGS. 1 and 2, mixer 14 is shown schematically as depositing a single relatively wide stream of slurry designated 15. In actual practice, a common expedient is to deposit several separate streams across the table, the plastic streams merging by lateral gravitational flow before reaching the master rolls.

A pair of relatively small slurry agitators 16 and 17 are shown disposed just below the main mixer 14, between the main mixer 14 and the master rolls 11 and 12. Agitators 16 and 17 are shown depositing streams 18, 19 of mixed slurry through hoses 20, 21, each along one marginal edge of the main stream or body of slurry 15. In the alternative, a single small slurry agitator, located wherever convenient, may be provided with two discharge openings or a single discharge opening with two hoses 20 and 21 for depositing the two edge streams. Hoses 20 and 21 are preferably of about $\frac{3}{4}$ inch inside diameter.

The agitators 16 and 17 receive gypsum slurry from main mixer 14 through hoses 22, 23. Feed pipes 25, 26 feed gypsum set retarder into the agitators 16, 17, closely adjacent the entering gypsum slurry.

The gypsum slurry from main mixer 14 contains a substantial amount of foam as it becomes mixed with the retarder and as it enters agitators 16 and 17. The agitators 16 and 17 act immediately to break the foam cells in the slurry, releasing much of the air that was entrapped in the foam cells. As the slurry is agitated in the agitators 16 and 17 and as it proceeds therefrom, down the hoses 20 and 21, it gives up much of the contained air within it, becoming progressively denser.

Considering the lengthwise direction of the apparatus of FIGS. 1 and 2, the agitators 16 and 17 need not be located as there shown, but may be closer to the main mixer 14 and, in fact, may be to the left of main mixer 14 as viewed in FIGS. 1 and 2, so that the side streams of slurry 18 and 19 are deposited in advance of the deposit of the main stream 15.

The upstanding edges of the facing sheet 13 are folded in over the deposited slurry between the agitators 16 and 17 by conventional means not shown and an upper paper facing sheet 27 is applied over the slurry streams 15, 18 and 19 and over the inturned edges of facing sheet 13 at the master rolls 11 and 12 in a conventional manner. The subsequent apparatus and operation of the entire wallboard machine is entirely conventional in the manner in which the boards are dried and cut to length.

However, because of the greater density of the gypsum and water mix at the board edges, the drying of the already set gypsum core is somewhat slower than it would be if it hadn't been defoamed and thus, even though edges have greater surface exposure, than the board center portion, and are thinner than the center, the drying at the edges is as slow as in the main cellular body of the board and preferably even slower, whereby there is no recalcination of the gypsum at the board edges. In the form of the invention here described, the superior quality and strength of the board edges is due jointly to the greater density at such edges and the added strength arising directly therefrom, as well as to the greater strength which arises from the fact that the slurry at the edges, by the relative slowness of its drying is not recalcined and thus is completely hydrated calcium sulphate.

In the general method of wallboard manufacture referred to herein by way of example, the wallboards are fabricated with their front or outer faces down so that lower facing sheet 13 is the front facing sheet of the ultimate wallboard or panel, as appears from a consideration of FIG. 3 which shows one side edge portion of such a wallboard in cross-section. It will be noted from FIG. 3 that the slurries 15, 18 and 19 form a single monolithic core of the same set cementitious material, although the edge portions thereof, as at 19, are denser and harder than the cellular central portion indicated at 15 in FIG. 3.

The retarder used for retarding the set of the gypsum in the densified mix may be any of the known set retarders for gypsum. The preferred retarder is a hydrolyzed proteinaceous material, essentially as described in U.S. Pat. No. 2,865,905, and sold by National Gypsum Company as Gold Bond Retarder. The slurry 15 may also contain a set retarder, which may be of the same composition or a different composition; however, it is essential, in accordance with the invention, that if the densified mix is made from the foamed slurry from mixer 14, and it already contains some retarder, then a special addition of retarder must still be made just prior to or simultaneous with the foamed mix going into the agitators 16 and 17.

Agitators 16 and 17 may be of any of many varied forms and construction, so long as they are able to agitate the gypsum slurry passing therethrough adequately to break down the foam and cause substantial increase in the slurry density. Typically a 4000 r.p.m. high speed rotary agitator, as shown in FIG. 4, will remove a very substantial proportion of the foam in a foamed gypsum slurry. Agitator 16 consists of a hollow cylindrical body 30 having an inlet 31 at one end and an outlet 32 at the opposite end. An entirely closed cylindrical body 30 has a length which is about equal to the body radius, for example about three inches. Agitation of material passing through the hollow cylindrical body 30 is accomplished by a multi-paddle wheel 33 with a shaft 34 which extends through the wall of cylindrical body 30. Paddle 33 and shaft 34 are rotatably driven by a motor 35, preferably a variable drive having a speed of about 3000–7000 r.p.m.

The standard form of gypsum wallboard 28 is four feet wide and having a thickness of $\frac{3}{8}$ to $\frac{5}{8}$ inch. Normally the wallboard edge is tapered, with the edge of the board thinner than the center of the board, as shown in FIG. 3. The side streams of slurry 18 and 19 are each preferably about two to four inches wide, however as little as about $\frac{1}{2}$ inch, if it could be kept uniform, could be effective in providing the benefits sought in making hard edges. With a tapered portion which is three inches wide, a three-inch wide stream of higher density is advantageous. The degree of defoaming accomplished by the invention is not critical; however, an increase in density by defoaming of about 10% will produce a wallboard of significant superiority to a wallboard having uniformly foamed core throughout.

It will be understood that with different strength retarders, different amounts will be required. A suitable amount of Gold Bond hydrolyzed proteinaceous retarder for use in the two agitators 16 and 17, during the manufacture of a thousand square feet of $\frac{1}{2}$ inch gypsum wallboard is considered to be about 3 grams. $1\frac{1}{2}$ in each agitator; however the advantages of the invention are expected to be provided in various degrees over a wide range of amounts of retarder.

In place of a gypsum set retarder, a freshly added water reducing agent can be used to increase the fluidity of the defoamed mix, allowing the smaller $\frac{3}{4}$" inside diameter discharge hoses 20 and 21 to be used, from the agitators 16 and 17. Either a set retarder or a water reducing agent will increase the fluidity of the defoamed mix and can so function without adversely affecting the density of the setting characteristics.

Suitable water reducing agents include Marasperse C-21, a powdered sodium-calcium lignosulfonate of American Can Company; Marasperse B-22, a powdered calcium lignosulfonate of American Can Company; Norlig G, an aqueous solution of calcium-sodium lignosulfonate of American Can Company; Lignosite, a powdered, or aqueous solution of, calcium lignosulfonate of Georgia-Pacific Corporation; or Orzan AL-50, an aqueous solution of ammonium lignosulfonate of Crown Zellerbach.

Water reducing agents are commonly used to permit a decrease in the amount of water needed in an aqueous dispersion; however, in the present invention the water reducing agents function to increase the fluidiy of the defoamed mix, permitting faster flowing characteristics, and thus a smaller hose than the common prior one inch inside diameter discharge hoses. With the faster flowing characteristic, there is provided a more complete self cleaning and, consequently, little if any setting action by the settable gypsum and build-up of pre-set gypsum as it passes through the hoses.

Having completed a detailed disclosure of the preferred embodiments of my invention so that those skilled in the art may practice the same, I contemplate that variations may be made without departing from the essence of the invention or the scope of the appended claims.

I claim:

1. In a method of manufacturing gypsum wallboard which comprises depositing a central stream of foamed plastic gypsum on a table and depositing separate streams of relatively unfoamed plastic gypsum along opposite sides of the central stream, leveling the combined streams to form a single flat slab, and drying to produce a unitary monolithic core having edge portions of greater density than the main central portion of the monolithic core, the improvement wherein said separate streams of relatively unfoamed plastic gypsum are formed by diverting a portion of foamed plastic gypsum to at least one agitator and admixing with said diverted portion, prior to a subsequent agitation of said diverted portion, a freshly added material wherein said added material is of the group consisting of gypsum set retarders and water reducing agents and which has properties which result in increasing the fuuidity of the subsequently agitated material without adversely affecting the setting characteristics thereof and without causing any decrease in the density thereof, subjecting said diverted portion to said agitation, said agitation being of sufficient intensity to cause the loss of a substantial volume of foam causing a substantial increase of density therein whereby said deposited stream of relatively unfoamed plastic gypsum is of substantially greater density relative to said deposited central stream of foamed plastic gypsum, said separate streams of relatively unfoamed plastic gypsum amounting in volume to sufficient material to form continuous elongate core edge portions at each edge of said wallboard of from about one-half inch to about four inches wide.

2. The method of claim 1 wherein said added material is a gypsum set retarder.

3. The method of claim 1 wherein said depositing of separate streams of relatively unfoamed plastic gypsum involves conducting said streams through elongate hoses.

4. The method of claim 3 wherein said hoses have an inside diameter of about ¾ inch inside diameter.

5. The method of claim 1 wherein said agitation causes an increase in density of said plastic gypsum when dried of at least 10% relative to said foamed plastic gypsum when dried.

6. The method of claim 1 wherein said agitation is provided by a rotary paddle which is rotated at about 3000 to 7000 r.p.m.

7. The method of claim 2 wherein said gypsum set retarder is added to the slurry to be agitated at a rate of about 3 grams per thousand square feet per ½ inch thickness of wallboard.

8. The method of claim 7 wherein said depositing of separate streams of relatively unfoamed plastic gypsum involves conducting said streams through elongate hoses.

9. The method of claim 8 wherein said hoses have an inside diameter of about ¾ inch inside diameter.

* * * * *